United States Patent
Kersch et al.

(10) Patent No.: US 7,316,933 B2
(45) Date of Patent: Jan. 8, 2008

(54) METHOD FOR PRODUCING AN ANNULAR MICROSTRUCTURE ELEMENT

(75) Inventors: Alfred Kersch, Putzbrunn (DE); Wolfgang Raberg, Fontainebleau (FR); Siegfried Schwarzl, Neubiberg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/112,743

(22) Filed: Apr. 22, 2005

(65) Prior Publication Data

US 2005/0250344 A1    Nov. 10, 2005

Related U.S. Application Data

(63) Continuation of application No. PCT/DE03/03284, filed on Oct. 2, 2003.

(30) Foreign Application Priority Data

Oct. 22, 2002    (DE)    ............................ 102 49 207

(51) Int. Cl.
*H01L 21/00* (2006.01)
(52) U.S. Cl. .................. 438/3; 438/48; 257/E21.665
(58) Field of Classification Search ............. 438/20, 438/48, 3; 257/E21.665
See application file for complete search history.

(56) References Cited

U.S. PATENT DOCUMENTS

| | | | |
|---|---|---|---|
| 4,353,935 A | 10/1982 | Symersky | |
| 4,883,770 A * | 11/1989 | Dohler et al. | ................ 438/507 |
| 5,641,611 A | 6/1997 | Shieh et al. | |
| 5,925,919 A | 7/1999 | Kerber | |
| 5,953,587 A * | 9/1999 | Forrest et al. | ................ 438/99 |
| 6,190,980 B1 | 2/2001 | Yu et al. | |
| 6,297,516 B1 * | 10/2001 | Forrest et al. | ................ 257/40 |
| 6,351,410 B1 | 2/2002 | Nakao et al. | |
| 6,458,603 B1 | 10/2002 | Kersch et al. | |
| 6,921,722 B2 * | 7/2005 | Ogure et al. | ................ 438/708 |
| 2002/0042158 A1 | 4/2002 | Kersch et al. | |
| 2003/0207043 A1 * | 11/2003 | Fritzemeier et al. | ........ 427/551 |

FOREIGN PATENT DOCUMENTS

EP    0 762 806 A2    3/1997

OTHER PUBLICATIONS

Yoder, Max N., "Microelectronics / Nanoelectronics and the 21st Century," IEEE 2001, pp. 2-7.

* cited by examiner

*Primary Examiner*—Michelle Estrada
(74) *Attorney, Agent, or Firm*—Slater & Matsil, L.L.P.

(57) ABSTRACT

An annular microstructure element, in particular an annularly arranged monolayer or multilayer thin film, is formed over a substrate (S), e.g., for use in a magnetoresistive memory. To that end, a masking layer is applied over the substrate. An opening (C) is etched into the masking layer, so that a partial region of the surface is uncovered. The etching operation is performed in such a way that the opening (C) is formed with an overhang (B). The overhang at least partially shades the uncovered surface from an incident particle beam (TS). A particle beam (TS) is directed at the substrate (S) at an oblique angle ($\alpha$) of incidence. In this case, the substrate (S) is rotated relative to the directed particle beam (TS). From the particle beam, material is thereby deposited annularly on the uncovered surface for the purpose of forming a hole-like microstructure element (R).

17 Claims, 10 Drawing Sheets a=20° - - - -   a=25° - - - - - -   a=30° ········· a=20° - - - -   a=25° - - - - - -   a=30° ·········

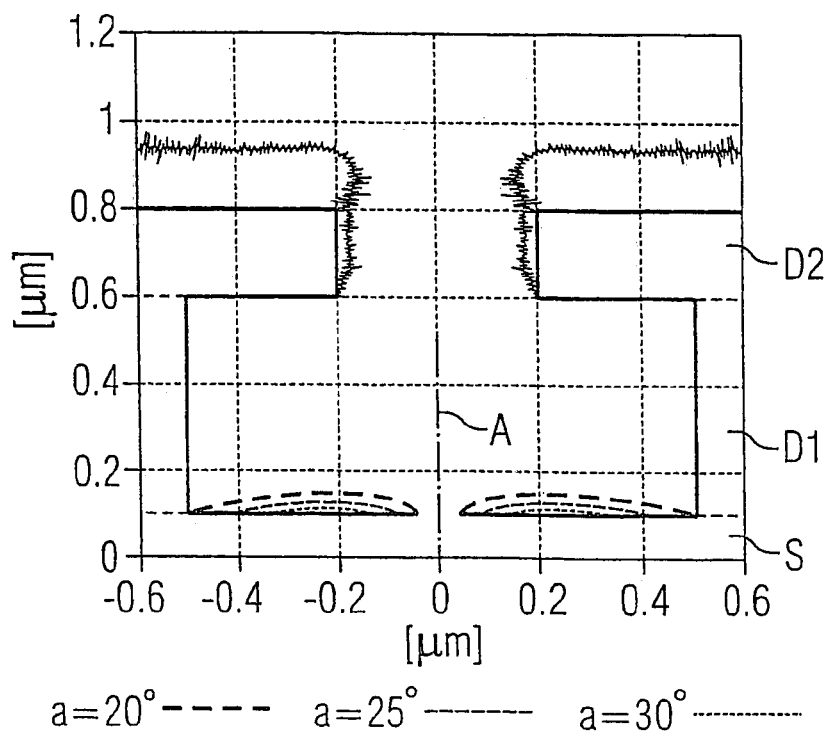
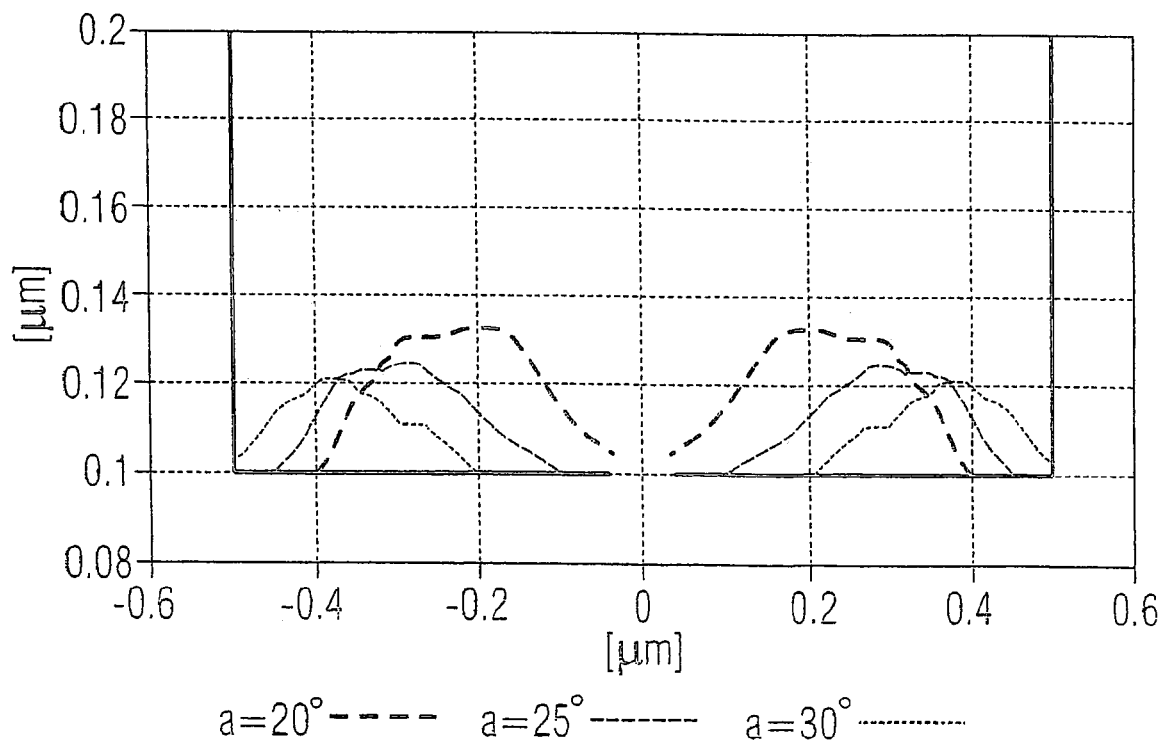

a=30° - - - -  a=35° ———  a=40° ········ a=30° - - - -  a=35° ———  a=40° ········

$a=30°$ ---   $a=35°$ ------   $a=40°$ ··········

$a=30°$ ---   $a=35°$ ------   $a=40°$ ··········

METHOD FOR PRODUCING AN ANNULAR MICROSTRUCTURE ELEMENT

This application is a continuation of co-pending International Application No. PCT/DE2003/003284, filed Oct. 2, 2003, which designated the United States and was not published in English, and which is based on German Application No. 102 49 207.7, filed Oct. 22, 2002, both of which applications are incorporated herein by reference.

TECHNICAL FIELD

The present invention relates to a method for producing an annular microstructure element, in particular an annularly arranged monolayer or multilayer thin film on a substrate for use in a magnetoresistive memory (MRAM).

BACKGROUND

Thin films are formed for example for the purpose of producing GMR (Giant Magnetoresistance) or TMR (Tunneling Magnetoresistance) elements in memories. GMR elements have at least two ferromagnetic layers between which is arranged a nonmagnetic, conductive layer that exhibits the so-called GMR effect. In the case of the latter, the electrical resistance due to the three layers or thin-film layers is dependent on the orientation of the magnetization in one of the two ferromagnetic layers relative to the magnetization direction of the other ferromagnetic layer. In this case, a parallel or antiparallel orientation may result as stable states of the magnetization.

TMR elements have at least two ferromagnetic layers between which an insulating, nonmagnetic layer is arranged in each case. The latter is patterned thin enough such that a tunneling current from a first to a second of the ferromagnetic layers may occur. In a similar manner to the GMR elements, the magnetoresistive effect consists of having different resistances depending on a parallel or antiparallel orientation of the magnetization of the two ferromagnetic layers. The spin-polarized tunneling current flowing through the thin layer arranged between the two ferromagnetic layers is subject to larger resistance changes, which may amount to up to 40%, in the case of the TMR effect compared with the GMR effect.

The above-mentioned GMR and TMR elements may advantageously be used in memory cells for storage of a binary information item. While one of the two ferromagnetic layers is usually patterned with an essentially invariable magnetization direction, the second ferromagnetic layer has the property of being able to be reprogrammed from the parallel to the antiparallel state or vice versa by means of an externally applied magnetic field of sufficient strength. Such a magnetic field may be formed for example by means of the magnetic fields that are generated and superposed by word and bit lines that cross one another. Accordingly, a memory cell is programmed by means of corresponding driving of the word and bit lines.

German patent application DE 199 08 519.6 or M. N. Yoder, "Microelectronics-Nanoelectronics and the 21st Century", p. 2-7, IEEE 2001, discloses annular monolayer or multilayer thin-film systems as GMR or TMR elements. They afford the advantage of a closed magnetic flux within the rings, so that magnetic interference fields occur toward the outside beyond the local region of the memory element only during a magnetization reversal process that is carried out for the purpose of programming. Since it is thus possible, in particular, also for adjacent magnetoresistive memory elements to be magnetically decoupled, it is theoretically possible to achieve higher integration densities of thin-film layer microstructure elements in memory cell arrangements.

The possibility of achieving higher integration densities in the prior art is limited, however, by the below-described disadvantages of the conventional methods for producing microstructure elements based on thin films.

Firstly, the monolayer or multilayer thin-film system is deposited over the whole area onto a substrate comprising, by way of example, monocrystalline silicon and a number of patterned layers arranged on the silicon. The thin-film system comprises at least three layers in the case of GMR or TMR elements. Afterward, the thin-film system is patterned by means of lithographic and etching processes in such a way that all that remains are the annular microstructures comprising, by way of example, the at least three layers of the memory elements. In the lithography step, a photosensitive resist with the desired annular form, which is arranged on the thin-film system, is exposed and developed. In the etching step, the structures produced in the resist are transferred into the thin-film system. For this purpose, it is possible to use known plasma etching methods such as, for example, RIE (Reactive Ion Etching), ECT (Electron Cyclotron Resonance), ICP (Inductively Coupled Plasma), CAIBE (Chemically Assisted Ion Beam Etching) methods, etc.

However, the materials that comprise the ferromagnetic layers such as iron, nickel or cobalt, lead as reaction products, on account of their lack of volatility, to a disadvantageous redeposition of metallic layers at the etching sidewalls of the microstructures formed. This may in turn lead to short circuits arising at the outer edges of the microstructures. A further disadvantage arises from the fact that, on account of the intensified ion bombardment required for etching the ferromagnetic layers, there is only low selectivity during the etching of the thin film in comparison with the etching mask, for example of the resist or a hard mask, and also with respect to a further metallic or dielectric support. The latter may comprise copper, tantalum or silicon dioxide, for example. Therefore, particularly thick resist or hard masks are required, which in turn leads to a loss of dimensional accuracy during the structure transfer and to oblique etching sidewalls at the microstructures. Lateral insulation of the TMR or GMR elements by means of dielectric spacers, for example, is thereby made more difficult.

If a chlorine-containing gas is used for the plasma etching process, then a disadvantageous corrosion of the layer system may additionally occur particularly in the case of antiferromagnetic iron-manganese or iridium-manganese.

In order to avoid the described problem with the reaction products, it is also possible to use a so-called damascene technique, in which the structure formation is firstly performed in a dielectric layer that is already present, which, as trench structures, are subsequently filled with the desired films in a deposition process. Layer portions projecting outside the trench or hole structures formed are polished back as far as the surface of the dielectric layer in a chemical mechanical polishing process (CMP), for example. It is also possible to use a homogeneous etching process in this case. A deposition may be carried out for example by means of a physical or chemical vapor deposition process (PVD, CVD) or an electrodeposition.

However, since the layer sequence is deposited vertically at the trench walls particularly in the case of multilayer systems, the polishing process uncovers the outer edge of the thin-film system at the surface of the substrate. This may result for example in short circuits when making contact with interconnects that are subsequently formed.

The German patent application DE 100 50 076.5 describes how microstructures of the thin-film systems can be obtained by sputtering or vapor deposition of the relevant materials in perforated masks which, by virtue of overhangs in the hole profiles, the so-called shadowmasks, are constricted in an upper region in such a way that the sputtered particles can only reach a central region of the base area of the hole structures. The advantage is that the deposited layers do not reach as far as the trench wall since the corresponding particles from the sputtering process cannot reach the trench wall on account of the overhang in the hole profile. Consequently, vertical layer portions that could be uncovered by a CMP process do not arise.

However, it has not yet been possible heretofore to find a suitable process with which the advantageous annular microstructures could be formed by application of this technique. Shaping a hole in the center of the thin-film system for the purpose of forming the ring would necessitate, in the case of high integration densities, shaping a mushroom-shaped structure on account of the overhang, which structure would have a high degree of physical instability, e.g., with respect to the effects of subsequent processes. Therefore, high integration density cannot be achieved by means of this method.

SUMMARY OF THE INVENTION

Therefore, an object of the present invention is to specify a method for fabricating annular microstructures by means of which it is possible to achieve high integration densities in conjunction with high quality. Moreover, an object of the invention is to avoid the above-mentioned disadvantages of the metallic layers—deposited on the microstructures as a result of deposition of reaction products in a plasma etching process—of the consequence of short circuits. In particular, it is an object of the present invention to offer a method in which a plasma etching process applied to the annular structures formed is no longer necessary.

The object is achieved by means of a method for producing an annular microstructure element, in particular an annularly arranged monolayer or multilayer thin film on a substrate for use in a magnetoresistive memory, comprising the following steps: provision of the substrate with a surface and a perpendicular normal to the surface; formation of at least one masking layer on the substrate, so that the masking layer directly covers the surface; formation of an opening in the masking layer for the purpose of uncovering a possible region of the surface, the masking layer being formed within the opening with an overhang in such a way that the uncovered surface is at least partially shaded from an incident particle beam by the overhang; deposition of at least one material on a first partial area of the uncovered surface by means of a particle beam, which is directed at the substrate and forms an angle other than 0° with the normal to the surface; and rotation of the substrate with the masking layer and the opening relative to the directed particle beam for the purpose of depositing the material on at least a second partial area of the uncovered surface for the purpose of forming an annular microstructure on the uncovered surface of the substrate.

According to the present invention, firstly a masking layer is formed on a substrate, which may comprise, by way of example, in addition to a monocrystalline semiconductor material such as silicon as base, also a plurality of layers arranged above the latter with dielectric, insulating, metallic, doped, electrically conductive structures. The masking layer is, by way of example, one or a plurality of dielectric materials. The masking layer may be formed, by way of example, in a physically enhanced chemical deposition process (PECVD) on the substrate.

For the purpose of structure formation in the masking layer, in a lithographic process, a photosensitive resist is applied on the masking layer and exposed with a structure in an exposure step. After a corresponding developer step has been carried out, the structure formed in the resist mask is transferred into the masking layer in an etching process in such a way that, on the one hand, a partial region of the surface of the substrate is uncovered below the structure formed in the resist and, on the other hand, the etching profile of the structure in the masking layer has a larger diameter at the foot of the trench etched into the masking layer than in an upper region of the trench. An overhang of the masking layer is thus produced, which overhang leads to a shading of parts of the surface in the etched-free trench of the masking layer. The overhang is preferably formed in such a way that it encompasses the entire length of the upper region of the trench etched in the masking layer, that is to say is formed all around.

According to the present invention, a directed particle beam is aimed at the substrate covered with the masking layer and in particular in the etched-free trench or the hole with the overhang at an oblique angle of incidence. In accordance with refinements of the present invention, the particle beam may be implemented from an IBD process (Ion Beam Deposition), a sputtering process with an annular cathode or a directed vapor deposition process, etc. What is desirable is the presence of a sufficient degree of focusing or a small difference in the particle beam, so that, by virtue of the oblique angle of incidence, the hole cross section decreased by the overhang in the trench structure is imaged at the bottom of the trench in laterally offset fashion by the particle beam. The deposition of particles accordingly takes place firstly in a side region partially below an overhang on the surface of the substrate.

The extent of the lateral offset may be controlled directly through the choice of the oblique angle of incidence of the particle beam. Only the vertical extent of the overhang is to be taken into account here as restrictive.

In accordance with one refinement of the present invention, the angle between the normal to the surface and the direction of particle incidence is to be chosen at least with a magnitude such that, even as a result of the scattering of the radiated particles that is always present, only small or even no portions impinge on the point of intersection between the axis of symmetry of the trench, the axis of symmetry being parallel to the normal to the surface, and the surface of the substrate. This position marks the hole in the thin-film system to be formed, which makes this into a ring.

As a result of a rotation of the substrate relative to the particle beam preferably while maintaining the substrate plane, i.e., a constant angle of incidence of the particle beam, further, laterally offset partial regions of the surface in the trench structures are subsequently provided with a particle deposit for the purpose of layer formation by the particle beam. Under these conditions, the center—described by the axis of symmetry of the trench structure—of the uncovered surface at the bottom of the trench structure is not covered or is hardly covered with a particle deposit.

By contrast, a thin-film system is formed all around in the laterally offset outer regions of the surface. The process of rotation and deposition of particles in a directed beam may be effected as desired. The two processes, rotation and irradiation directed at an oblique angle of incidence, may be effected continuously in parallel or individually or together in each case progressively. The present invention also makes it possible to form half-rings.

In accordance with a preferred refinement of the present invention, the directed particle beam is generated with a divergence of less than 10°. The divergence indicates an average angular deviation of scattered particles relative to the main direction of the directed particle beam. Particularly advantageous values for cross-sectional profiles are achieved with beam divergences of less than 5°. The lower the degree of divergence, the higher the focusing of the beam on the outer partial regions of the surface within the opening. The center of the surface, which subsequently forms the hole in the annular structure, is thereby advantageously kept free of particle deposits.

In accordance with a further refinement of the present invention, the opening or the trench with the overhang formed therein is formed in a circular or an elliptical form. The form of the opening is defined for example in the lithographic exposure in the resist on the masking layer. The choice of a circular form leads, through the method according to embodiments of the invention, to a circular ring of deposited particles in the thin-film layer system on the uncovered surface of the substrate.

In accordance with a preferred refinement of the present invention, the size of the overhang in the trench structure or the opening is made possible by formation of an at least two-layered masking layer. To that end, a first and a second layer with a different selectivity with respect to an etching process are applied on the substrate. The two layers preferably comprise dielectric materials, for example $Si_3N_4$ or $SiO_2$. After the lithographic process for defining the opening in the masking layer, firstly an anisotropic plasma etching process is carried out. By means of the latter, the structure formed in the resist on the masking layer in the lithographic exposure and development step is transferred dimensionally accurately into the first and second dielectric layers. The surface of the substrate is preferably already uncovered as a result.

The overhang is formed by subsequently carrying out an isotropic wet or dry etching process, which etches the first, lower dielectric layer selectively with respect to the second, upper dielectric layer. This process, called "undercutting" produces an overhang in the second, upper dielectric layer, the horizontal extent of which overhang can be defined comparatively accurately by means of a time-determined end point control. The vertical extent of the overhang is essentially given by the thickness of the second, upper dielectric layer. The vertical and horizontal extent of the overhang are coordinated with the angle of incidence of the particle beam in order to produce the annular structure.

In addition to the above-mentioned conditions wherein the angle of incidence with respect to the normal to the surface must be sufficiently large so that the point of intersection between the axis of symmetry and the surface at the bottom of the opening and also the surroundings thereof are not covered or are hardly covered with scattered particles, it is also necessary for the overhang to assume a sufficiently large horizontal extent and the angle of the incident beam to assume a minimum value. Consequently, only few or even no particles are deposited at the edge of the surface that is uncovered on the bottom of the opening. It is thus advantageously the case that no vertical layer portions of the thin-film system are produced at the trench wall.

The formation of the annular microstructure element may be continued by filling the opening formed with a dielectric material and subsequently polishing back the dielectric layers for the purpose of uncovering the annular structure.

BRIEF DESCRIPTION OF THE DRAWINGS

The invention will now be explained in more detail using an exemplary embodiment with the aid of a drawing, in which.

The following list of reference symbols can be used in conjunction with the figures

| | | | |
|---|---|---|---|
| α | Angle of incidence | R | Annular particle deposit, microstructure element |
| A | Axis of symmetry | S | Substrate |
| B | Overhang | T1 | Target No. 1 |
| C | Opening | T2 | Target No. 2 |
| D1 | First dielectric layer | TA | Particle deposition on dielectric layer |
| D2 | Second dielectric layer | TS | Particle beam |
| FS | Filling layer | U | Voltage source for acceleration from plasma |
| P | Plasma | IK | Ion beam gun |
| EG | Extraction grid | IS | Ion beam |
| M | Resist mask | | |

DETAILED DESCRIPTION OF ILLUSTRATIVE EMBODIMENTS

Figure 1:
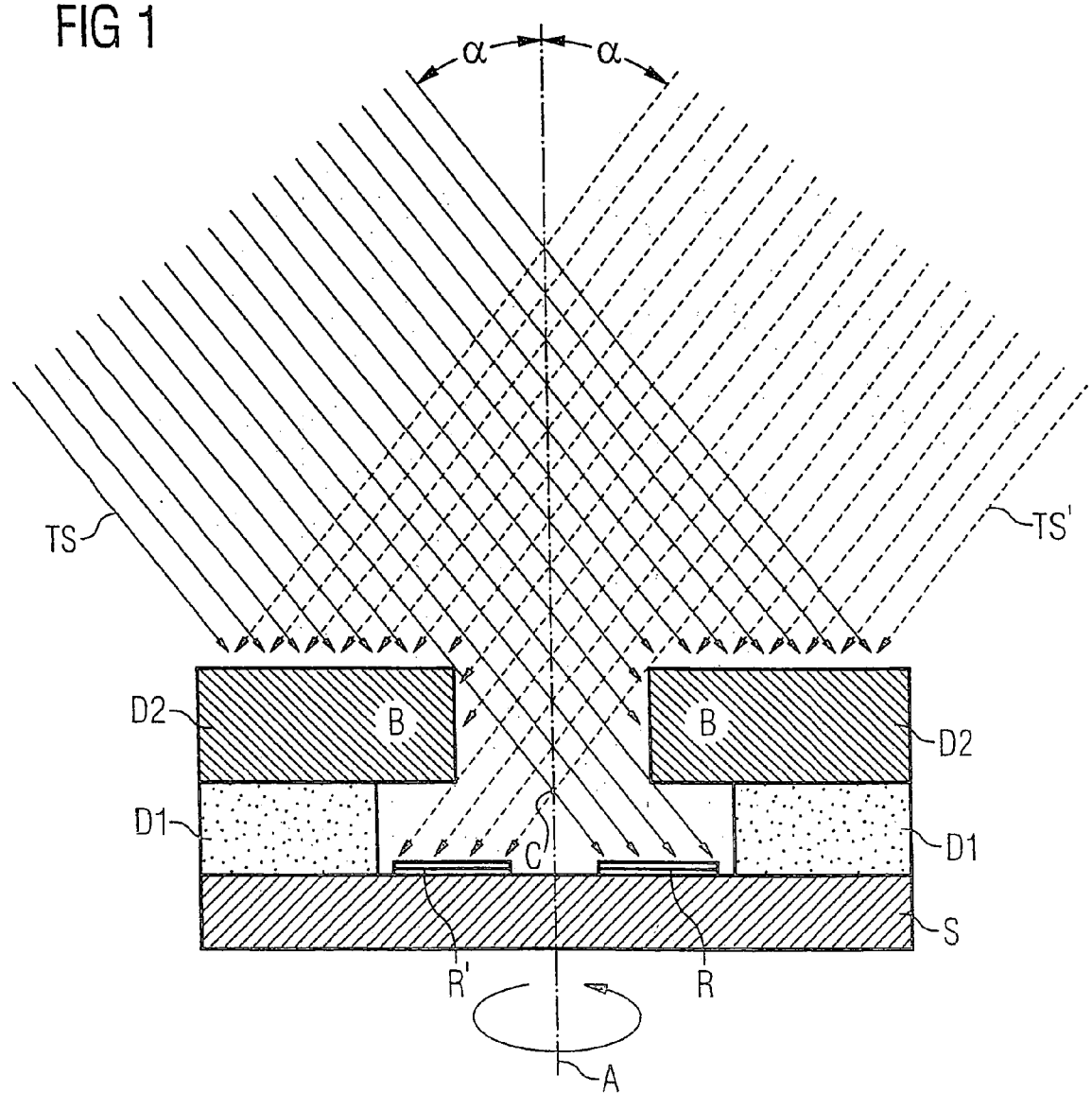
FIG. 1 shows an exemplary embodiment according to the invention of the method with a particle beam that is obliquely incident on an opening formed with an overhang in a masking layer on a rotating substrate for the formation of annular microstructures.

A diagrammatic illustration of the irradiation of a substrate S with particles in accordance with the invention's method for fabricating annular microstructures can be seen in FIG. 1. The figure shows a cross-sectional illustration through an opening C formed according to embodiments of the invention, which opening is formed on the substrate S in a masking layer. Arranged on the substrate S is a first dielectric layer D1 and a second dielectric layer D2, which together form the masking layer.

The opening C has a cross-sectional profile in which an overhang B is formed in an upper region by the second dielectric layer D2. The diameter of the opening C is smaller in the upper region than the diameter in a lower region, which is characterized by a first dielectric layer D1 drawn back with respect to the second dielectric layer D2.

The irradiation with a particle beam TS is carried out at an angle α with respect to a perpendicular normal to the surface of the substrate S, or the axis A of symmetry of the opening C which angle differs from 0°, i.e., the particle beam TS is incident obliquely rather than perpendicularly. In the example, the angle α is about 40°. The angle with respect to a plane spanned by the surface of the substrate S is accordingly about 50°.

Wherever particles impinge on the uncovered substrates or the second dielectric layer D2, thin-film layers form on account of the deposition. On account of the shading by the overhang B and on account of the oblique angle α of incidence, the opening C of the upper region of the layer D2 is imaged in the particle beam TS in laterally offset fashion on the surface of the substrates at the bottom of the opening C and forms a thin film R there. In this case, the angle α is dimensioned such that particles can impinge neither at the edge of the uncovered surface nor in the center.

Rotation of the substrate S about the axis A of symmetry in the previous substrate plane alters the azimuthal angle of the particle beam with respect to a reference direction of the substrate. This is illustrated in FIG. 1 in the reference system of the substrate by means of a second particle beam TS'. The practiced person skilled in the art is at liberty to rotate the substrate S and keep the radiation direction constant or else to fix the substrate S and vary the radiation direction. Combinations of the two are also possible.

By means of the second particle beam TS', a second partial area R' opposite the first partial area R on the uncovered substrate surface is covered with a thin film. Therefore, continuous rotation of the substrate S results in the uniform formation of a ring-like microstructure comprising, inter alia, the partial areas R, R' as a thin film.

Figure 2:
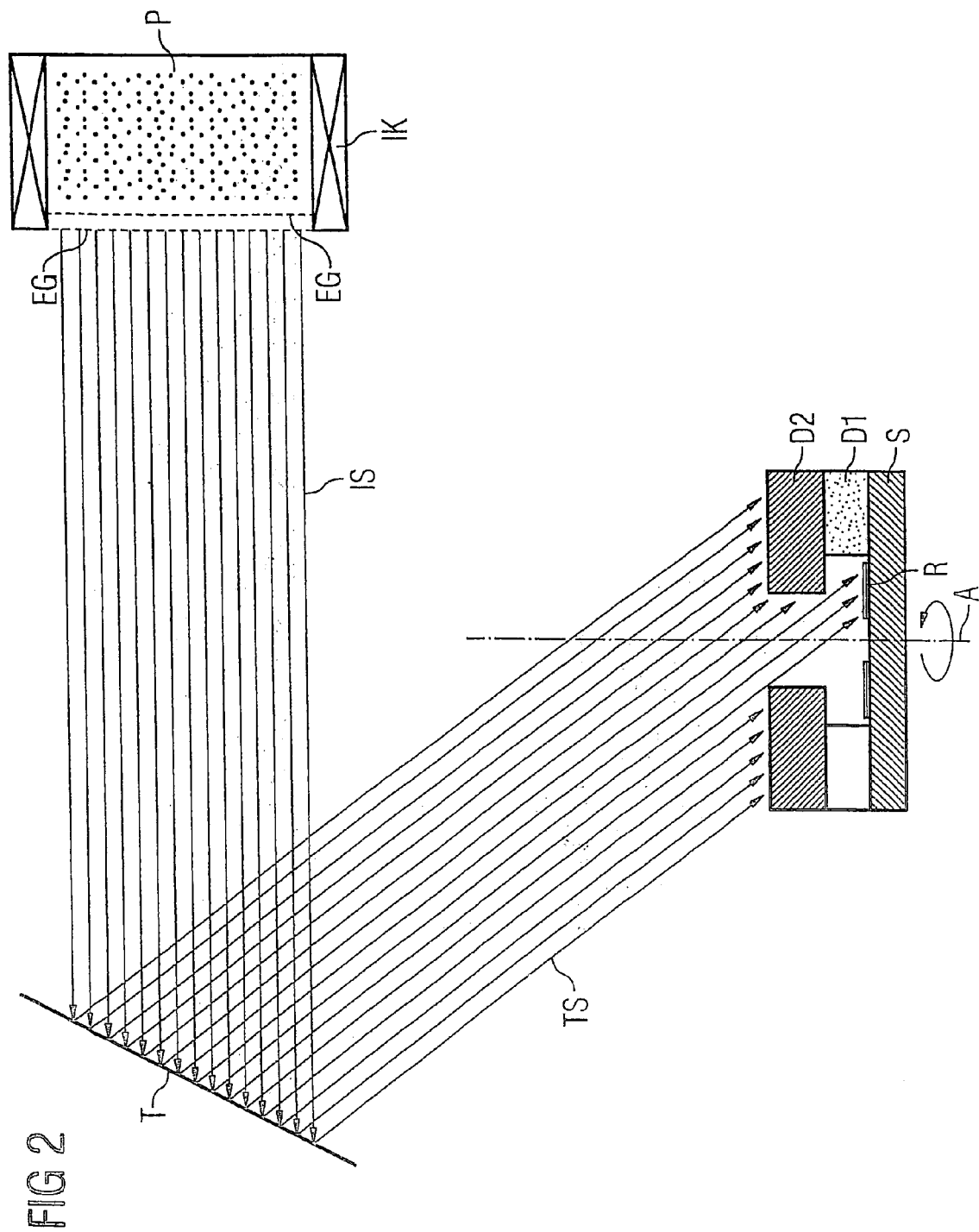
FIG. 2 shows an exemplary embodiment according to the invention of the method for the formation of annular microstructures with an obliquely incident particle beam generated by an ion beam gun and a sputtering target.

An exemplary embodiment for generating a particle beam according to embodiments of the invention is shown in FIG. 2. A plasma P is generated in an ion beam gun IK, ions being extracted from the plasma by an extraction grid EG, to which a bias voltage is applied, and being accelerated as ion beam IS in the direction of a sputtering target T, to which a further voltage U (see label in FIG. 3) is applied. The sputtering target T, with a small extent, is at a comparatively large distance from the substrate S, so that the divergence of the particle beam TS of particles ejected from the target T is less than 10°.

Figure 3:
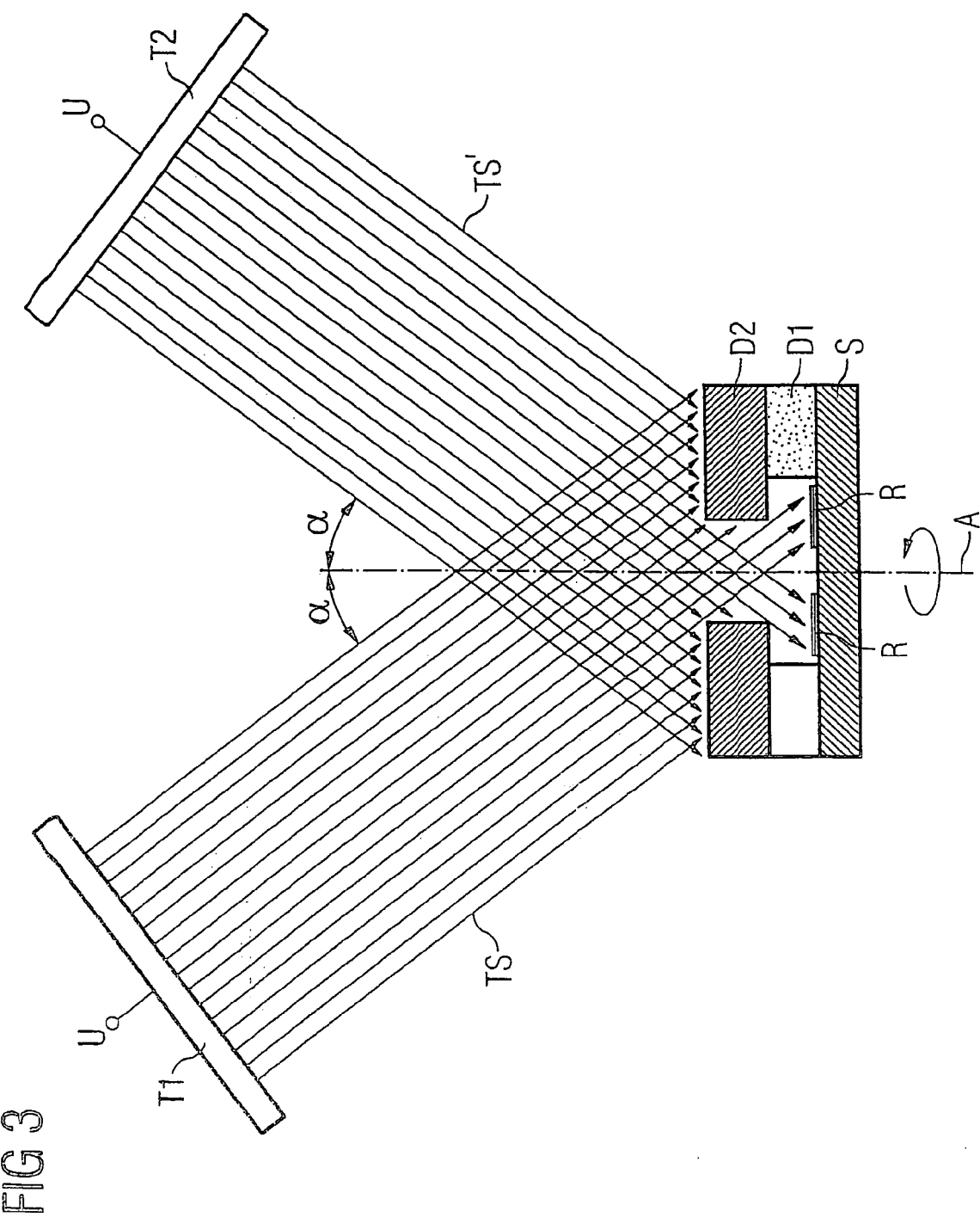
FIG. 3 shows an exemplary embodiment according to the invention of the method for the formation of annular microstructures with a sputtering target formed from a number of annularly arranged segments.

An alternative to the exemplary embodiment for generating a particle beam according to embodiments of the invention is shown in FIG. 3. In this case, a plurality of partial segments T1, T2 of a sputtering target are arranged annularly above a fixed substrates, so that, by means of simultaneous ion bombardment of all the targets T1, T2 from an ion beam gun IK, a plurality of particle beams TS, TS' can be aimed at the substrates from different directions at the same angle α. The targets T1, T2 are cathodes of an RF-or DC-fed sputtering system, for example.

The production of the opening C according to embodiments of the invention in the masking layer D1, D2 comprising the overhang B, which opening is necessary for the formation of the annular structure, is described below.

Figure 4:
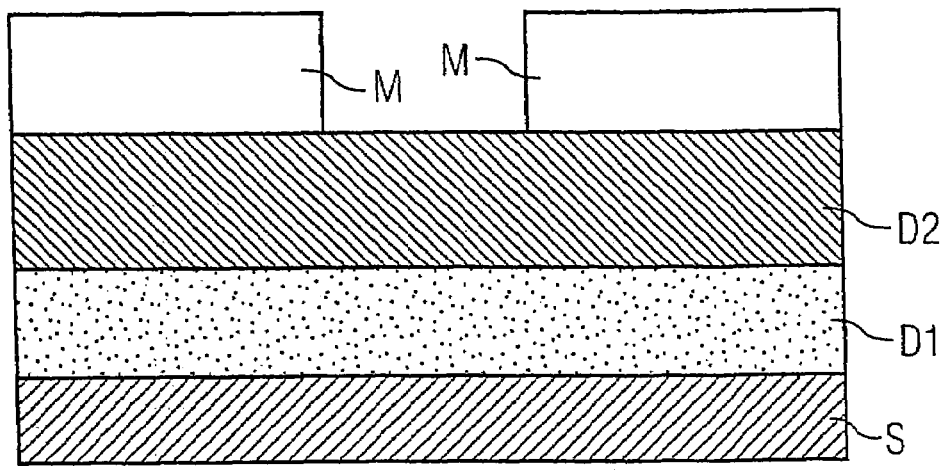
FIGS. 4-9 show an exemplary sequence of steps of the method for fabricating the masking layer comprising a first and a second dielectric layer.

As is illustrated in FIG. 4, a first dielectric layer D1 made of $Si_3N_4$ and having a thickness of 50 nm is formed in a PECVD deposition on a substrate S comprising monocrystalline silicon and also a number of layers formed thereon, for example interconnects made of electrically conductive material for making contact with the magnetoresistive annular memory element to be formed. Afterward, likewise in a PECVD deposition step, a second dielectric layer D2 made of $SiO_2$ and having a thickness of 200 nm is deposited on the first dielectric layer D1.

The second dielectric layer D2 is coated with a photosensitive resist and, in an exposure device, photolithographically exposed with a structure of a mask that has a diameter of 350 nm. In order to form a resist mask M, the resist is developed, so that the exposed regions are dissolved away (FIG. 4).

An anisotropic RIE (reactive ion etching) of the second dielectric layer D2 is subsequently carried out using a mixture of $CHF_3$, $CF_4$ and Ar, so that the exposed structure is transferred into the layer D2.

Figure 5:
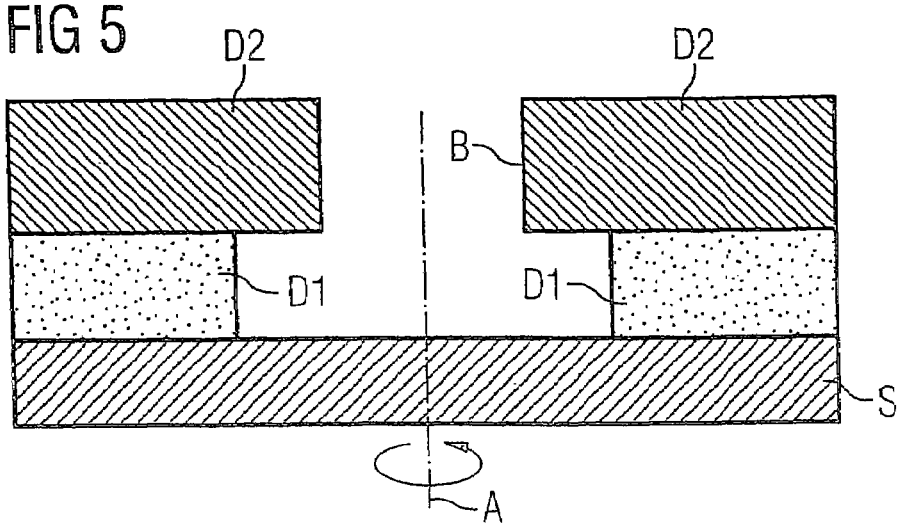

The first dielectric layer D1 comprising $SiO_2$ is then subjected to an essentially isotropic RIE etching using a mixture of $CF_4$, $O_2$ and $SF_6$ or alternatively $NF_3$. A wet chemical etching using $H_3PO_4$ at 160 to 180° C. is also possible. The resist mask is then removed wet-chemically or in plasma by means of $H_2$, $N_2$ (FIG. 5). As a result of isotropic etching, the second dielectric layer D2 is undercut within the opening C formed by the etching steps, so that an overhang B is produced all around in an upper region corresponding to the second dielectric layer D2.

Figure 6:
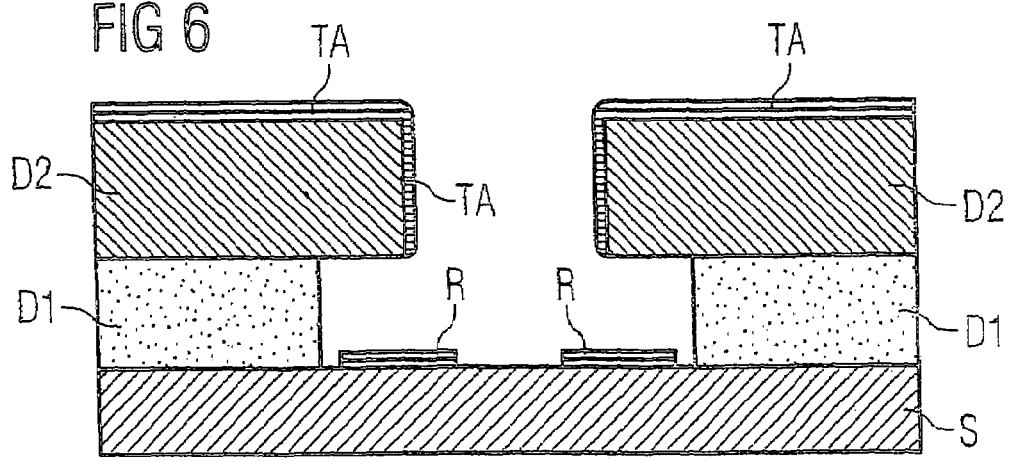

As the next step, the oblique irradiation described in the introduction and shown in FIGS. 1-3 is carried out, e.g., by sputtering of a highly collimated particle beam with rotation of the substrate S. In order to form a GMR or TMR memory element, targets of a ferromagnetic and of a dielectric (TMR) or nonmagnetic, electrically conductive (GMR) material are to be used alternately for this purpose. An annular thin-film structure R having at least three layers is thus produced within the opening. Particles are also deposited as thin deposition layer TA on the horizontal and vertical areas of the second dielectric layer D2 (FIG. 6).

Figure 7:
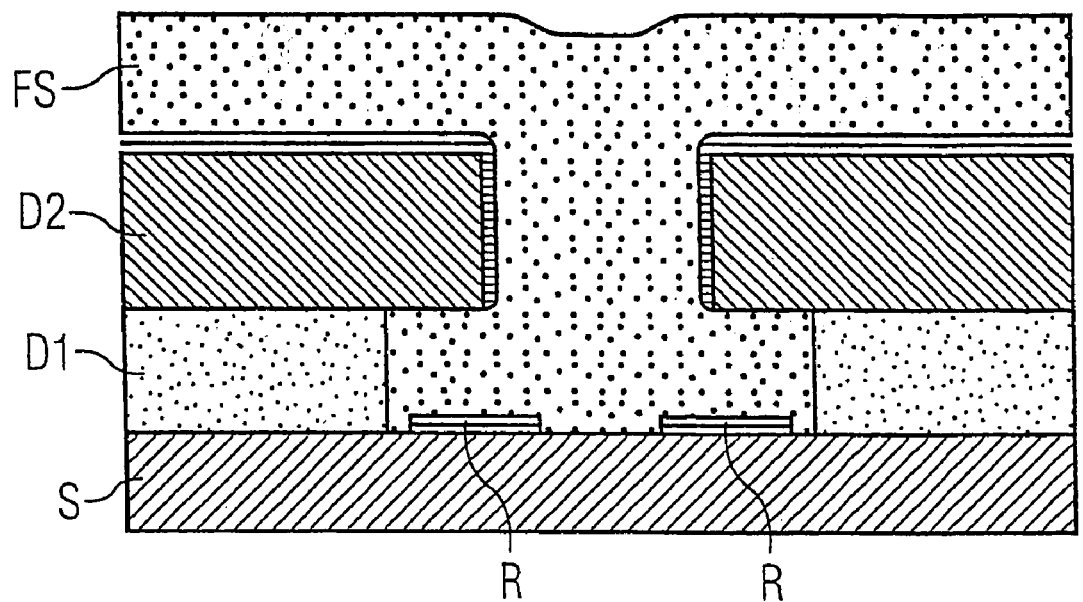
Figure 8:
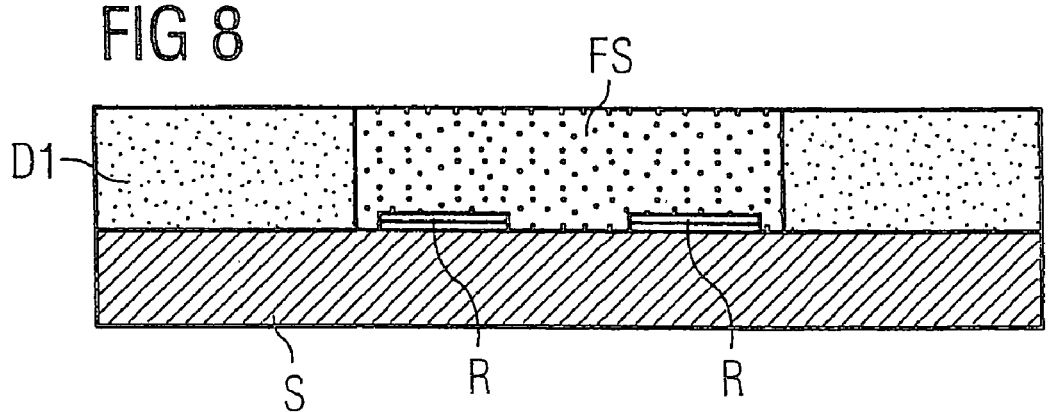

In a PECVD or alternatively an SOG method (spin-on glass), $SiO_2$ is deposited as filling layer FS in order to fill the opening C (FIG. 7). The layer FS and also the second dielectric layer D2 are ground back together with the particle deposits adhering thereto in a chemical mechanical polishing step (CMP) down to a surface of the first dielectric layer D1 (FIG. 8).

Figure 9:
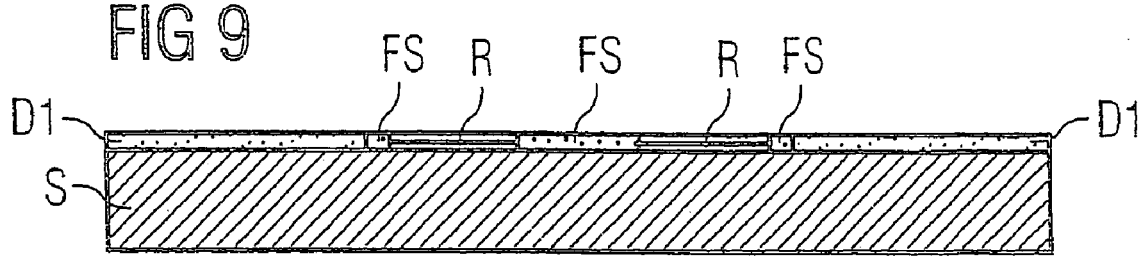

The annular microstructure elements R are uncovered by the first dielectric layer D1 comprising $Si_3N_4$ also being polished back in a further CMP step (FIG. 9).

Figure 10A:
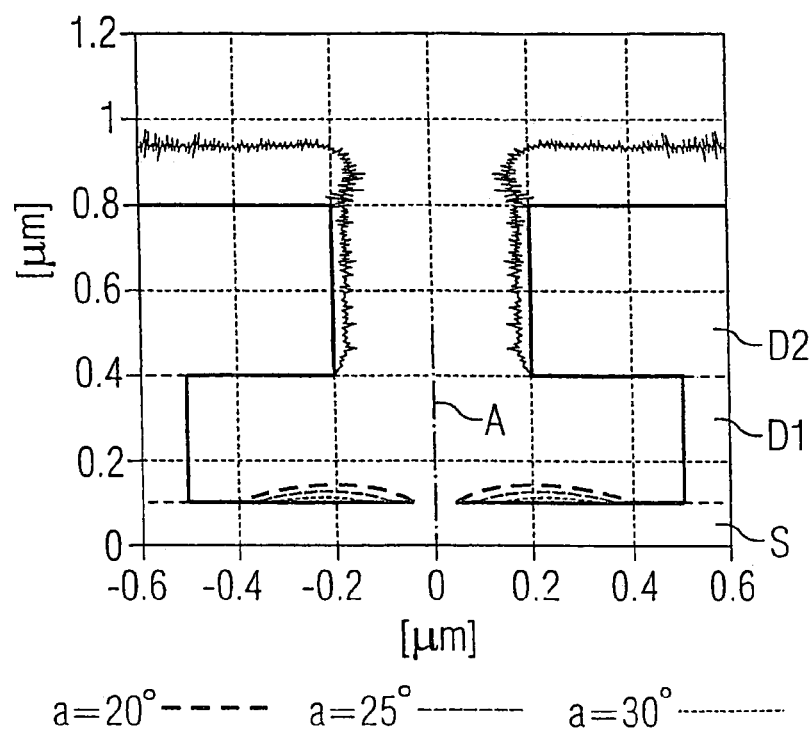
FIGS. 10-13 show simulations of the deposition of thin films from directed particle beams for various profiles of the openings and overhangs.
Figure 10B:
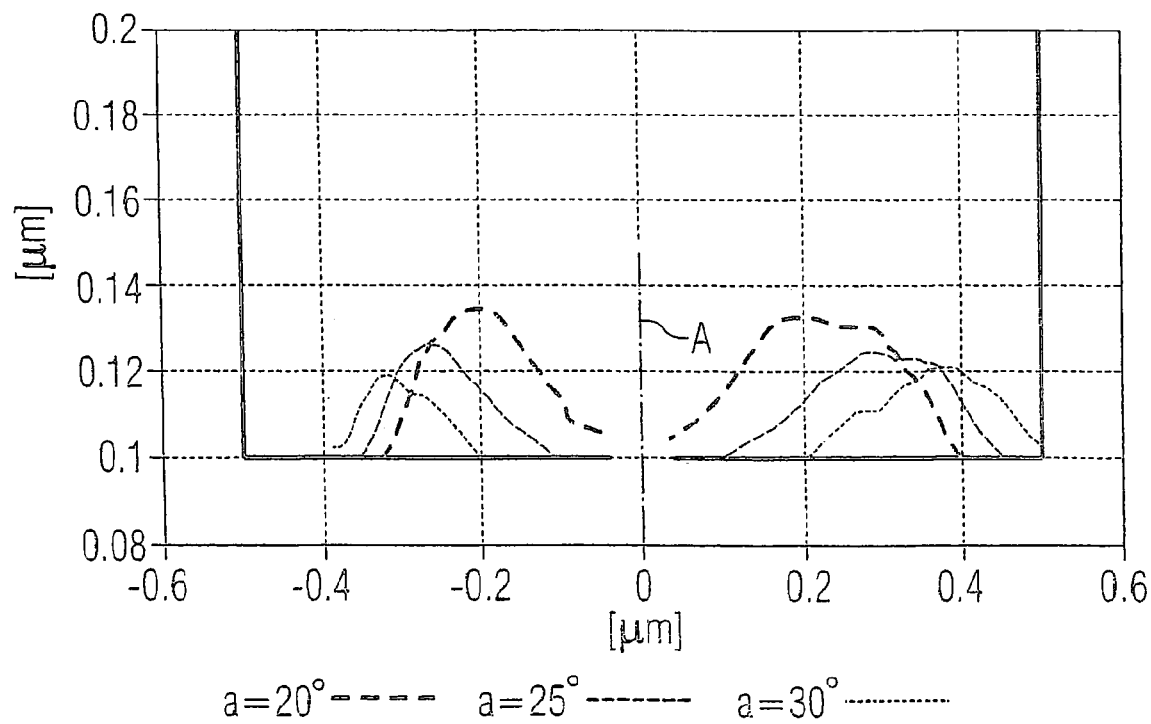

FIG. 10, comprising FIGS. 10a-10d, illustrates a layer deposition—simulated in a model—of a highly collimated particle beam into differently configured openings C of the shadowmasks according to embodiments of the invention in cross-sectional profiles: FIGS. 10a and 10b show an example with a first dielectric layer D1 having a thickness of 0.3 μm and a second dielectric layer D2 having a thickness of 0.4 μm, and FIGS. 10c and 10d show an example with a first dielectric layer D1 having a thickness of 0.5 μm and a second dielectric layer D2 having a thickness of 0.2 μm. The overhang of the second layer D2 with respect to the first layer D1 is about 0.3 μm.

FIGS. 10b and 10d respectively show in a diagram layer thickness curves of FIGS. 10a and 10c, which are illustrated in enlarged fashion in the direction of the ordinate (Y-axis).

In the last two examples mentioned, the particle beam TS is inclined by 20°, 25° and 30° with respect to the normal to the surface. The wafer was rotated. FIGS. 10b and 10d show in the dashed lines the results of the layer thicknesses achieved after an irradiation of the substrate S, which were averaged over 360° in the round hole structure C. The divergence of the particle beam TS is 1° in the half-width. The layer thicknesses achieved are about 20 nm.

Toward shallower angles of incidence for the particle incidence, the shielding effect formed by the overhang with the thickness of the second dielectric layer is manifested so distinctly that the formation of the thin film becomes ineffective if the angle with respect to the surface is less than 60° and the second layer D2 is thicker than the first layer D1 (FIG. 10b).

Toward deeper angles of incidence, the layer deposition shifts too much into the axis A of symmetry of the opening C—ring formation becomes disk formation.

If the second layer D2 and thus the overhang is chosen to be very thin, then the ring is formed very near to the trench wall at very shallow angles of incidence (FIG. 10d). This is disadvantageous for multilayer films such as, for instance, in the case of TMR elements, since vertical profiles that lead to the uncovering of the layers after CMP processes are produced.

The parameter intervals for layer thicknesses, layer thickness ratios and angles of incidence, which are shown in FIG. 10, thus represent particularly advantageous combinations with which the thin film structures according to the invention can be formed.

Figure 11A:
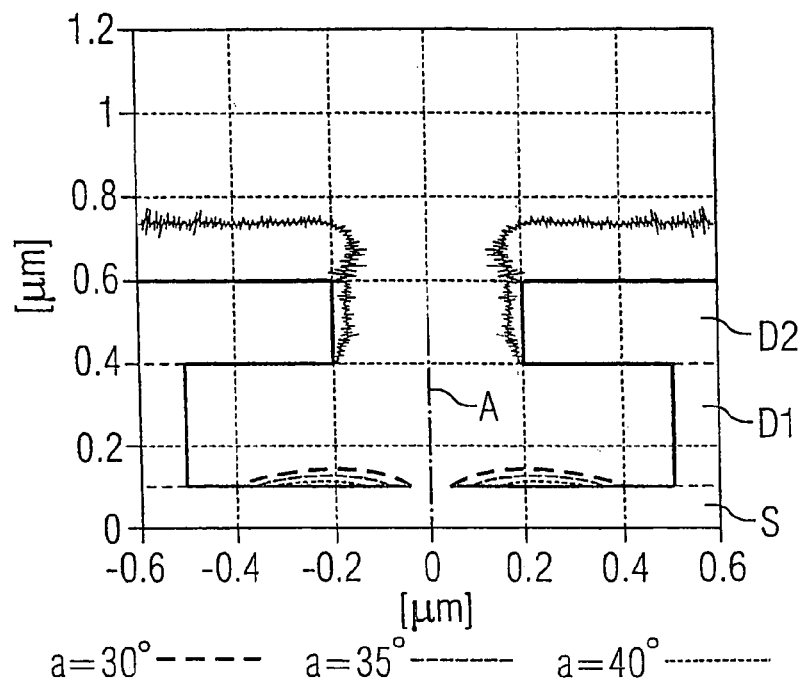
Figure 11B:
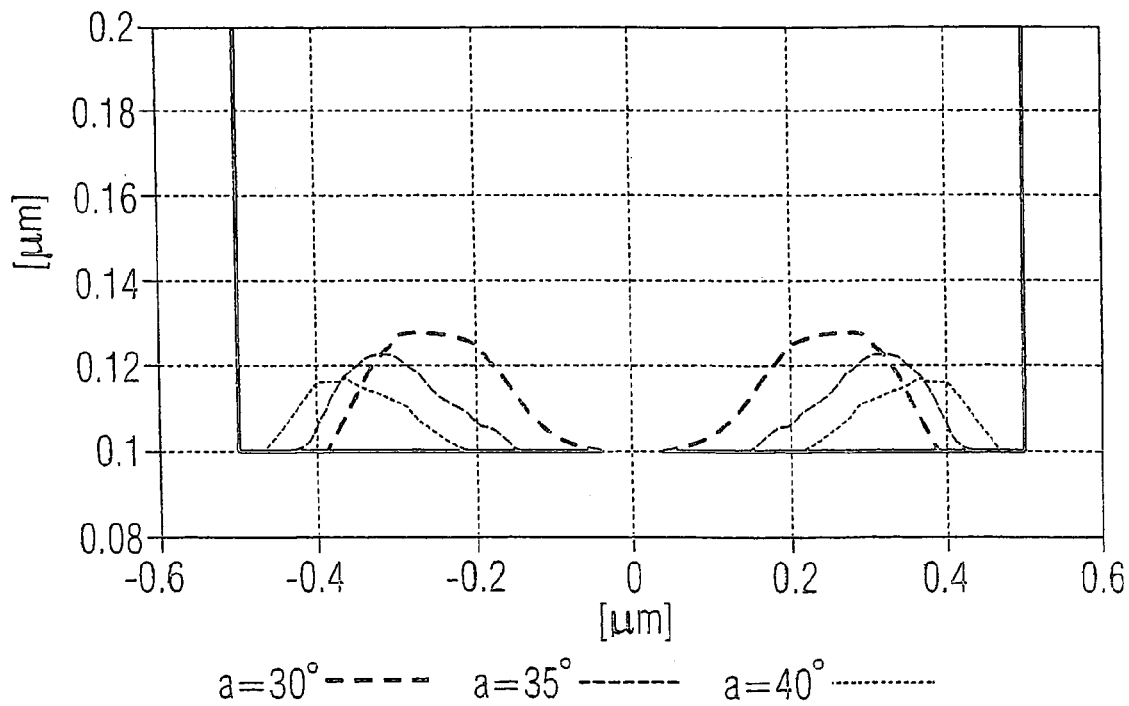
Figure 11C:
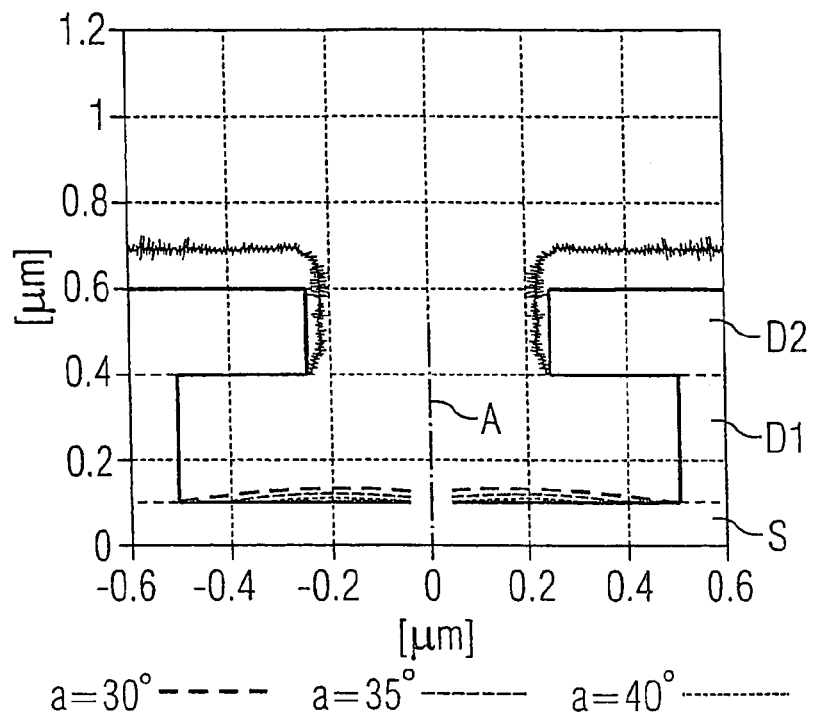
Figure 11D:
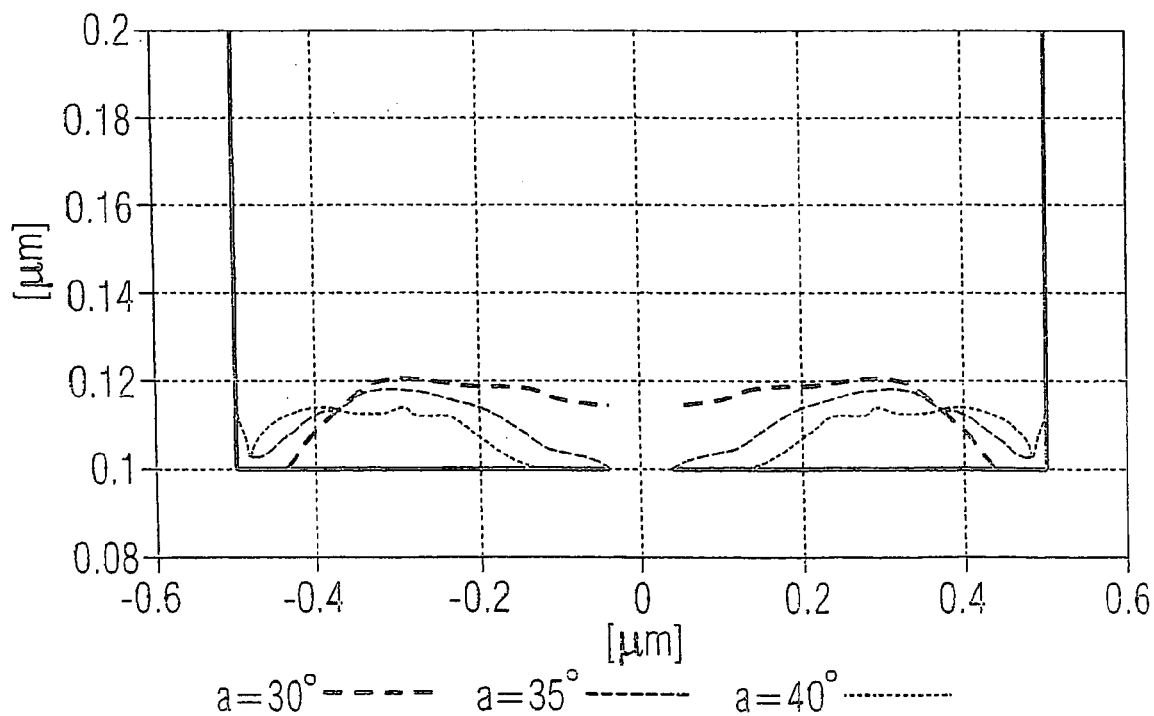

FIG. 11, comprising FIGS. 11a-11d, shows, in an illustration analogous to that in FIG. 10, the result of a layer deposition into different openings C of perforated mask structures. The cross-sectional profiles of the openings, which are shown in FIGS. 11a and 11c differ in terms of the opening diameter, namely 0.4 µm (FIG. 11a) and 0.5 µm (FIG. 11c). The thickness of the layers D1 and D2 is 0.3 µm and 0.2 µm, respectively. The particle beam divergence is 1°. In the case where the opening C has an excessively large diameter, the annular form of the deposition is lost primarily as a result of scattering effects, as shown by the comparison of FIGS. 11b and 11d.

Figure 12:
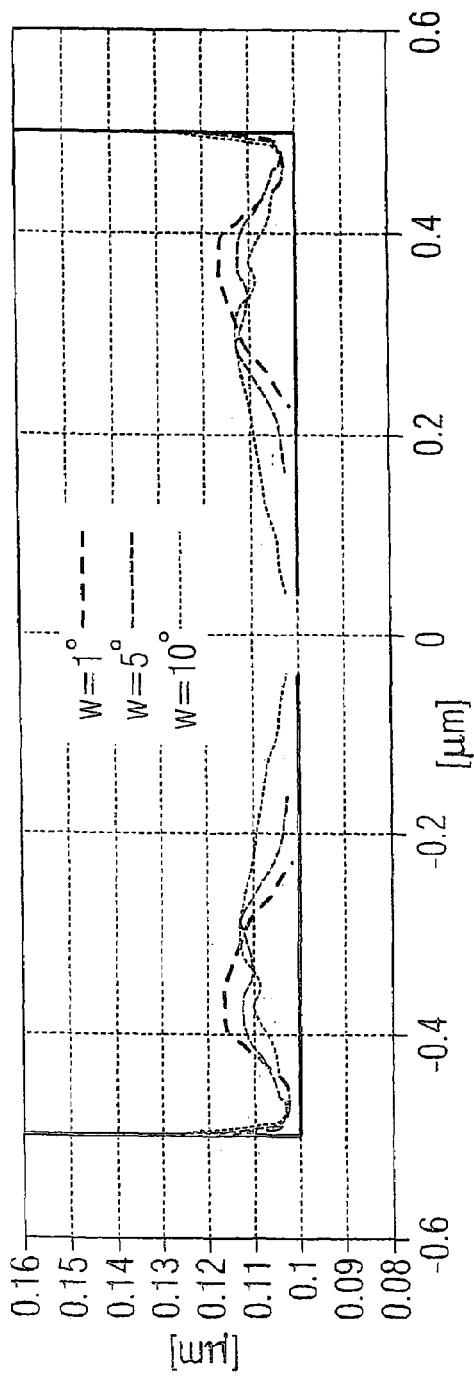
Figure 13:
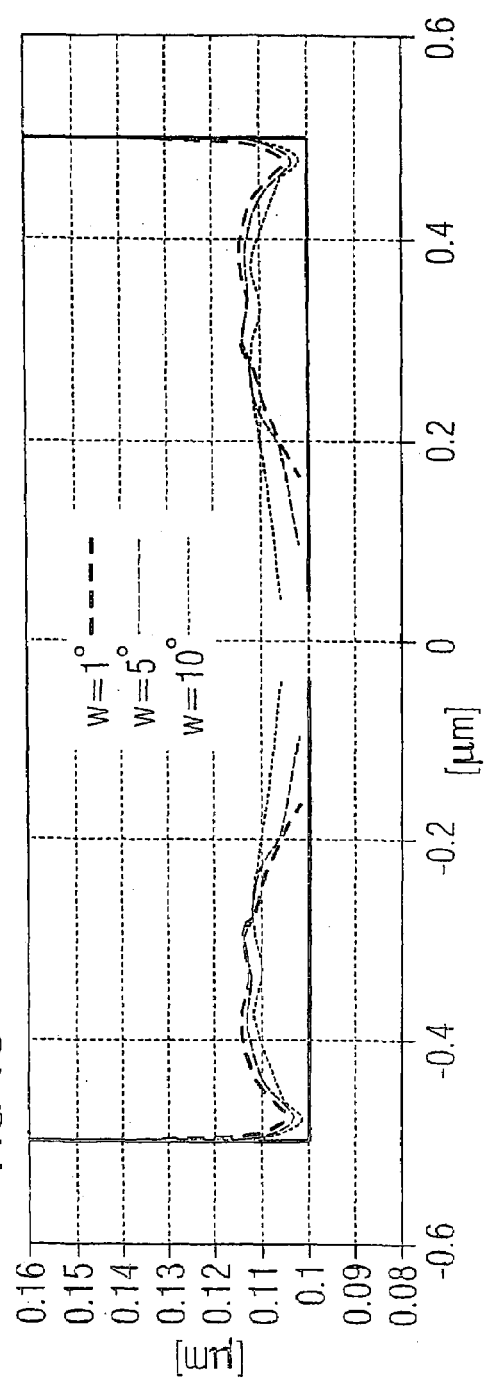

FIG. 12 shows deposition results for different divergences of particle beams for the exemplary embodiment illustrated in FIG. 11a. The dashed lines designate layer thicknesses with half-widths of 1°, 5° and 10°. The deposition profile illustrated in FIG. 13 analogously shows the result of a variation of the particle beam divergences for the exemplary embodiment described in FIG. 11c. A hole or ring structure is still preserved in the case of the narrower opening (example FIG. 11a) even in the case of relatively large divergences (see FIG. 13, the flattening of the deposition profile with respect to the axis of symmetry in the vicinity of the X coordinate "0 µm" in the center of the diagram).

For the opening with the larger diameter, a ring structure with vanishing layer thickness at the location of the axis of symmetry is possible precisely only for a divergence of 1°.

What is claimed is:

1. A method for producing an annular microstructure element, the method comprising:
   providing a substrate with a surface;
   forming at least one masking layer on the substrate, so tat the masking layer covers the surface;
   forming an opening in the masking layer for the purpose of uncovering a region of the surface, the opening including an overhang in such a way that the uncovered region is at least partially shaded from an incident particle beam by the overhang;
   depositing at least one material on a first partial area of the uncovered region by means of a particle beam that is directed at the substrate at an oblique angle of incidence, the angle of incidence forming an angle other than 90° with the surface, and a divergence of less than 10°; and
   rotating the substrate with the masking layer and the opening relative to the directed particle beam for the purpose of depositing the material on at least a second partial area of the uncovered region for the purpose of forming an annular microstructure element on the uncovered region of the substrate.

2. A method for producing an annular microstructure element, the method comprising:
   providing a substrate with a surface;
   forming at least one masking layer on the substrate, so that the masking layer covers the surface;
   forming an opening in the masking layer for the purpose of uncovering a region of the surface, the opening including an overhang in such a way that the uncovered region is at least partially shaded from an incident particle beam by the overhang, said overhang being formed in a circular or elliptical form;
   depositing at least one material on a first partial area of the uncovered region by means of a particle beam that is directed at the substrate at an oblique angle of incidence, the angle of incidence forming an angle other than 90° with the surface; and
   rotating the substrate with the masking layer and the opening relative to the directed particle beam for the purpose of depositing the material on at least a second partial area of the uncovered region far the purpose of forming an annular microstructure element on the uncovered region of the substrate.

3. A method for producing an annular microstructure element, the method comprising:
   providing a substrate with a surface;
   depositing a first layer over the surface of said substrate;
   depositing a second layer over the first layer;
   arranging a resist mask over the second layer, the resist mask including an opening over a portion of the second layer to uncover a region of the surface;
   performing an essentially anisotropic etching process to transfer the opening in the resist mask into the second layer;
   performing an essentially isotropic etching process to etch the first layer selectively with respect to the second layer, thereby forming an overhang in the second layer, such that the uncovered region is at least partially shaded from an incident particle beam by the overhang;
   depositing at least one material on a first partial area of the uncovered region by means of a particle beam that is directed at the substrate at an oblique angle of incidence, the angle of incidence forming an angle other than 90° with the surface; and
   rotating the substrate with the masking layer and the opening relative to the directed particle beam for the purpose of depositing the material on at least a second partial area of the uncovered region for the purpose of forming an annular microstructure element on the uncovered region of the substrate.

4. The method as claimed in claim 3, wherein performing an essentially anisotropic etching process further transfers the opening in the resist mask into the first layer.

5. A method for producing an annular microstructure element, the method comprising:
   providing a substrate with a surface;
   forming at least one masking layer on the substrate, so that the masking layer covers the surface;
   forming an opening in the masking layer for the purpose of uncovering a region of the surface, the opening including an overhang in such a way that the uncovered region is at least partially shaded from an incident particle beam by the overhang;
   depositing at least one material on a first partial area of the uncovered region by means of a particle beam that Is directed at the substrate at an oblique angle of incidence, the angle of incidence forming an angle other than 90° with the surface;
   rotating the substrate with the masking layer and the opening relative to the directed particle beam for the purpose of depositing the material on at least a second partial area of the uncovered region for the purpose of forming an annular microstructure element on the uncovered region of the substrate; and choosing the angle between the particle beam and the normal to the surface with a magnitude such that, on account of the overhang, the material deposited on the uncovered region of the substrate is deposited with a thickness that vanishes in the center of the uncovered region.

6. A method of fabricating a semiconductor device, the method comprising:

providing a substrate;

forming a mask over the substrate, the mask including an opening having selected dimensions, the opening including an overhang at an upper portion thereof; and depositing at least one material over the surface of the substrate by directing a particle beam toward the opening while the substrate and particle beam are rotated relative to one another, the particle beam being directed at an oblique angle of incidence, the selected dimensions of the opening and the oblique angle of incidence of the particle beam interacting such that an annular layer of the at least one material is deposited.

7. The method as claimed in claim 6, wherein rotating the substrate and particle beam relative to one another comprises rotating the substrate within the substrate plane such that the angle formed with the normal to the surface by the particle beam is not substantially altered during the rotation.

8. The method as claimed in claim 6, wherein forming a mask over the substrate comprises forming a first dielectric layer and fanning a second dielectric layer, the first and second dielectric layers each having at least one material, the first dielectric layer having an etch selectivity with respect to an etching process that differs from an etch selectivity with respect to the etching process of the second dielectric layer.

9. The method as claimed in claim 6, wherein forming a mask over the substrate comprises forming at least one masking layer on the substrate so that the masking layer directly covers the surface.

10. The method as claimed in claim 6, wherein forming a mask comprises:

depositing a first layer over the substrate;

depositing a second layer over the first layer;

arranging a resist mask over the second layer, the resist mask including an opening over a portion of the second layer;

performing an essentially anisotropic etching process to transfer the opening in the resist mask into the second layer; and performing an essentially isotropic etching process to etch the first layer selectively with respect to the second layer, thereby forming the overhang in the second layer.

11. The method as claimed in claim 10, wherein depositing the first layer comprises depositing an oxide layer and wherein depositing the second layer comprises depositing a nitride layer.

12. The method as claimed in claim 6, wherein the angle of incidence is between about 20° and about 40°.

13. The method as claimed in claim 6, further comprising removing the mask after depositing the at least one material.

14. A method of fabricating a magnetoresistive memory device, comprising:

providing a substrate:

forming a mask cover the substrate, the mask including an opening having selected dimensions, the opening including an overhang at an upper portion thereof:

depositing at least one material over the surface of the substrate by directing particle beam toward the opening while the substrate and particle beam are rotated relative to one another, the particle beam being directed at an oblique angle of incidence, the selected dimensions of the opening and the oblique angle of incidence of the particle beam intersecting such that an annular layer of the at least one material is deposited, wherein depositing the at least one material comprises depositing a first magnetic layer, depositing an intermediate layer, and depositing a second magnetic layer.

15. The meted as claimed in claim 14, wherein depositing an intermediate layer comprises depositing a nonmagnetic conductive layer.

16. The method as claimed in claim 8, wherein depositing an intermediate layer comprises depositing an insulating nonmagnetic layer.

17. A method for producing an annular microstructure element, the method comprising:

providing a substrate with a surface;

forming at least one masking layer on the substrate, so that the masking layer covers the surface;

forming an opening having selected dimensions in the masking layer for the purpose of uncovering a region of the surface, the opening including an overhang in such a way that the uncovered region is at least partially shaded from an incident particle beam by the overhang;

directing a particle beam at an oblique angle of incidence at the substrate to deposit at least one material on a first partial area of the uncovered region of the surface of the substrate: and rotating the substrate with the masking layer and the opening relative to the directed particle beam for the purpose of depositing the material on at least a second partial area of the uncovered region, said selected dimensions and said oblique angle of incidence interacting such the said particle beam does not impinge at the center of the uncovered surface such that an annular microstructure element is deposited on the uncovered region of the substrate.

* * * * *

UNITED STATES PATENT AND TRADEMARK OFFICE
CERTIFICATE OF CORRECTION

PATENT NO.         : 7,316,933 B2                                              Page 1 of 1
APPLICATION NO.    : 11/112743
DATED              : January 8, 2008
INVENTOR(S)        : Kersch et al.

It is certified that error appears in the above-identified patent and that said Letters Patent is hereby corrected as shown below:

In Col. 9, line 47, delete "tat" and insert --that--.
In Col. 10, line 18, delete "far" and insert --for--.
In Col. 10, line 62, delete "Is" and insert --is--.
In Col. 11, line 32, delete "fanning" and insert --forming--.
In Col. 12, line 8, delete "substrate:" and insert --substrate;--.
In Col. 12, line 9, delete "cover" and insert --over--.
In Col. 12, line 11, delete "thereof:" and insert --thereof;--.
In Col. 12, line 24, delete "meted" and insert --method--.
In Col. 12, line 28, delete "8" and insert --14--.
In Col. 12, line 52, delete "the" and insert --that--.

Signed and Sealed this

Seventeenth Day of June, 2008

JON W. DUDAS
*Director of the United States Patent and Trademark Office*